(12) United States Patent
Tudosie

(10) Patent No.: US 10,266,163 B2
(45) Date of Patent: Apr. 23, 2019

(54) STABILIZATION OF A VEHICLE COMBINATION

(71) Applicant: ZF Friedrichshafen AG, Friedrichshafen (DE)

(72) Inventor: Cosmin Tudosie, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/751,543

(22) PCT Filed: Jul. 19, 2016

(86) PCT No.: PCT/EP2016/067108
§ 371 (c)(1),
(2) Date: Feb. 9, 2018

(87) PCT Pub. No.: WO2017/029048
PCT Pub. Date: Feb. 23, 2017

(65) Prior Publication Data
US 2018/0229701 A1    Aug. 16, 2018

(30) Foreign Application Priority Data
Aug. 19, 2015    (DE) .................. 10 2015 215 802

(51) Int. Cl.
*B60T 7/20*    (2006.01)
*B60T 8/17*    (2006.01)
(Continued)

(52) U.S. Cl.
CPC ................ *B60T 8/248* (2013.01); *B60T 7/20* (2013.01); *B60T 8/172* (2013.01); *B60T 8/1708* (2013.01);
(Continued)

(58) Field of Classification Search
CPC ........ B60T 8/248; B60T 8/32; B60T 8/17551; B60T 8/172; B60T 8/1708;
(Continued)

(56) References Cited

U.S. PATENT DOCUMENTS

| 7,562,946 B2 | 7/2009 | Leimbach et al. |
| 2006/0244579 A1 | 11/2006 | Raab |

(Continued)

FOREIGN PATENT DOCUMENTS

| AU | 2013292777 B2 | 1/2014 |
| DE | 199 63 747 A1 | 7/2001 |

(Continued)

OTHER PUBLICATIONS

German Search Report Corresponding to 10 2015 215 802.0 dated Jun. 21, 2016.

(Continued)

*Primary Examiner* — Russell Frejd
(74) *Attorney, Agent, or Firm* — Davis & Bujold PLLC; Michael J. Bujold

(57) ABSTRACT

A vehicle combination comprising a tractor vehicle and a trailer vehicle, each vehicle including wheels on different sides of the vehicle and wheel brakes associated with the wheels. A method for controlling the vehicle combination includes determining a yaw rate difference between a yaw rate of the tractor vehicle and a yaw rate of the trailer vehicle; determining, on the basis of the yaw rate difference, that an orientation of one of the vehicles deviates from an intended travel direction of the vehicle combination; and activating a wheel brake of the vehicle on only one side of the vehicle in order to counter the orientation deviation of the vehicle relative to the intended travel direction.

8 Claims, 3 Drawing Sheets

(51) Int. Cl.
    *B60T 8/24*      (2006.01)
    *B60T 8/32*      (2006.01)
    *B60T 8/172*     (2006.01)
    *B60W 10/18*     (2012.01)
    *B60W 10/20*     (2006.01)
    *B60W 30/02*     (2012.01)
    *B60T 8/1755*    (2006.01)

(52) U.S. Cl.
    CPC ...... *B60T 8/17551* (2013.01); *B60T 8/17554* (2013.01); *B60T 8/32* (2013.01); *B60W 10/18* (2013.01); *B60W 10/20* (2013.01); *B60W 30/02* (2013.01); *B60T 2220/03* (2013.01); *B60T 2230/06* (2013.01); *B60T 2250/03* (2013.01); *B60T 2270/303* (2013.01); *B60W 2520/14* (2013.01)

(58) Field of Classification Search
    CPC ............. B60T 2230/06; B60T 2220/03; B60T 2270/303; B60T 2250/03; B60T 8/17554; B60T 7/20; B60W 30/02; B60W 10/18; B60W 10/20; B60W 2520/14
    See application file for complete search history.

(56) References Cited

U.S. PATENT DOCUMENTS

| | | | |
|---|---|---|---|
| 2008/0208424 A1 | 8/2008 | Hartman | |
| 2009/0093928 A1* | 4/2009 | Getman | B60T 8/1755 701/37 |
| 2009/0210112 A1* | 8/2009 | Waldbauer | B60T 8/1708 701/42 |
| 2010/0070149 A1* | 3/2010 | Fry | B60T 8/1708 701/70 |
| 2011/0029210 A1* | 2/2011 | Wu | B60D 1/30 701/70 |
| 2011/0257860 A1* | 10/2011 | Getman | B60T 8/1755 701/70 |
| 2012/0029782 A1 | 2/2012 | Suda | |
| 2013/0191000 A1 | 7/2013 | Hahne | |
| 2015/0232088 A1* | 8/2015 | Tagesson | B60W 30/02 701/41 |
| 2015/0367844 A1* | 12/2015 | Tagesson | B60T 8/1755 701/41 |
| 2016/0214586 A1 | 7/2016 | Michaelsen et al. | |

FOREIGN PATENT DOCUMENTS

| | | |
|---|---|---|
| DE | 101 28 692 A1 | 12/2001 |
| DE | 100 65 724 A1 | 7/2002 |
| DE | 103 26 190 A1 | 12/2004 |
| DE | 10 2004 022 113 A1 | 11/2005 |
| DE | 10 2012 000 783 A1 | 7/2013 |
| DE | 10 2012 014 408 A1 | 1/2014 |
| DE | 10 2013 014 819 A1 | 3/2015 |
| EP | 0 798 615 A1 | 10/1997 |
| WO | 2013/066215 A1 | 5/2013 |
| WO | 2014/070047 A1 | 5/2014 |

OTHER PUBLICATIONS

International Search Report Corresponding to PCT/EP2016/067108 dated Sep. 22, 2016.
Written Opinion Corresponding to PCT/EP2016/067108 dated Sep. 22, 2016.

* cited by examiner

STABILIZATION OF A VEHICLE COMBINATION

This application is a National Stage completion of PCT/EP2016/067108 filed Jul. 19, 2016, which claims priority from German patent application serial no. 10 2015 215 802.0 filed Aug. 19, 2015.

FIELD OF THE INVENTION

The invention concerns the stabilization of a vehicle combination.

BACKGROUND OF THE INVENTION

A vehicle combination comprises a tractor vehicle and a trailer vehicle, which are connected to one another by means of an articulated link. For a variety of reasons, for example when driving too fast downhill, or if there is a strong sidewind, or if the road is uneven, the tractor vehicle or the trailer vehicle can break away and depart from an intended direction of travel. The two vehicles can even start swerving more and more violently relative to one another in such manner that an oscillation movement about the link becomes increasingly pronounced, whereby the vehicle combination can become uncontrollable.

DE 10 2013 014 819 A1 concerns a technique for avoiding the swerving of a vehicle of a vehicle combination. For this, on several vehicles of the vehicle combination an individual swerving tendency is determined.

DE 10 2012 014 408 A1 proposes that in a vehicle combination, when driving round a curve the wheels on the outside of the curve should be braked if there is a risk that part of the vehicle may swerve.

SUMMARY OF THE INVENTION

The purpose of the present invention is to provide a better stabilization of a vehicle combination. The invention achieves that objective by virtue of the objects of the independent claims. The subordinate claims describe preferred embodiments.

A vehicle combination comprises a tractor vehicle and a trailer vehicle, each of which has wheels on different sides of the vehicle and wheel brakes associated with the wheels. The tractor vehicle can for example be in the form of a utility vehicle or a passenger car and the trailer vehicle can for example be a rigid-drawbar trailer, an articulated drawbar trailer or semitrailer, also called an articulated trailer. A method for controlling the vehicle combination comprises the steps of determining a yaw rate difference between a yaw rate of the tractor vehicle and a yaw rate of the trailer vehicle, then on the basis of the yaw rate difference determining that an orientation of one of the vehicles deviates from an intended travel direction of the vehicle combination, and activating a wheel brake of the vehicle on only one side of the vehicle in order to counter the orientation deviation of the vehicle relative to the intended travel direction.

If the vehicle combination is driving round a curve the yaw rates of the tractor vehicle and the trailer vehicle can differ from one another, especially when driving into or driving out of the curve. The driving in and out can be determined on the basis of a steering angle of the tractor vehicle and an intervention at one of the wheels can in that case be omitted. In all other cases a yaw rate difference that exceeds a predetermined threshold value indicates unstable vehicle behavior. By activating a wheel brake of one of the vehicles on only one side of the vehicle a torque can be exerted, which reduces the orientation deviation. It is also possible to brake wheels of both vehicles on one side in order to improve the stability of the vehicle combination. In that way, in particular, a tendency of the trailer vehicle to overtake the tractor vehicle can be countered. The vehicles can be brought back onto the same track so that the vehicle combination can be controlled better. In particular the tractor vehicle and the trailer vehicle can be steered into the intended travel direction independently of one another, which also stabilizes the vehicle combination.

Preferably, the intended travel direction is determined on the basis of a steering angle of a steered wheel of one of the vehicles.

The intended travel direction can also be determined on the basis of a speed of one of the vehicles. The speed can for example be determined on the basis of rotational speed sensors fitted on one or more wheels of the vehicle combination.

In a particularly preferred embodiment the yaw rate difference is determined on the basis of a time derivative of an articulation angle enclosed between the tractor vehicle and the trailer vehicle. In this way yaw rate sensors on board the tractor vehicle and the trailer vehicle can be saved and a much cheaper angle sensor in the area of an articulation between the tractor and trailer vehicles can be used. The angle sensor can in particular comprise a Hall sensor, which can be inexpensive and robust. In addition to the angle sensor, one or more yaw rate sensors can be used in order to determine absolute yaw rates, which can then be checked in a better way in relation to the intended travel direction.

In a further embodiment of the method, a wheel on the unbraked side of the vehicle is accelerated. In that way the torque intended to reduce the orientation deviation of the vehicle from the intended travel direction can be increased. For this, the wheel can have a wheel-specific drive mechanism such as an electric wheel hub drive.

In another embodiment, the wheel brake brakes the wheel on the braked side of the vehicle intermittently and the acceleration of the wheel on the unbraked side of the vehicle is increased during the braking pauses. The intermittent braking can be done for example by means of an anti-lock system. If the wheel is braked so severely that it becomes locked, the wheel brake is released for a short time in order to allow the wheel to run again. The acceleration of the opposite wheel is preferably done in phases during which the wheel brake is released. For this, a braking frequency during the intermittent braking can be reduced so that enough time is left for the other wheel to be accelerated. For example, a pause between two successive brake applications can be set at a quarter, a third, a half or a full second.

If the vehicle concerned has a plurality of wheels one behind another on both sides of the vehicle, then it is preferable for the wheel brakes of the wheels on the same side of the vehicle to be activated in accordance with their position, relative to a driving direction of the vehicle, consecutively from the rear toward the front. A chassis of the vehicle can in that way be better brought under traction, whereby a certain stabilizing effect can already be produced. Once all the wheel brakes have been applied for the first time a uniform braking of the wheels can take place.

In yet another embodiment, a length of the vehicle combination can be determined on the basis of a variation of the yaw rate difference when driving around a known curve, which can in particular be 90°. Driving around the curve is preferably controlled by a driver. The vehicle length can be determined in particular on the basis of the speed of the vehicle and the size of the yaw rate difference. Thereafter the vehicle length determined can be used to improve the autonomous control of the vehicle combination. In particular, driving around another curve can be carried out more easily by taking account of the vehicle length determined.

A computer program product comprises program code means for implementing the above-described method when the computer program product is run on a processing device or is stored on a computer-readable data carrier.

A control unit for the above-described vehicle combination comprises a sensor system for determining a yaw rate difference between a yaw rate of the tractor vehicle and a yaw rate of the trailer vehicle, and a processing device designed to determine, on the basis of the yaw rate difference, that one of the vehicles has deviated from an intended travel direction of the vehicle combination. The processing device is also designed in such a case to activate a wheel brake on only one side of the vehicle in order to counter the orientation deviation of the vehicle relative to the intended travel direction.

It is particularly preferable for the processing device also to be designed to control the vehicle combination autonomously. In that case the vehicle combination is operated purely automatically without human intervention and in particular without human monitoring. A driver of the vehicle combination can occupy himself with some other task or, for example, have a nap.

BRIEF DESCRIPTION OF THE DRAWINGS

The invention will now be described in more detail with reference to the attached figures, which show.

DETAILED DESCRIPTION OF THE PREFERRED EMBODIMENTS

Figure 1:
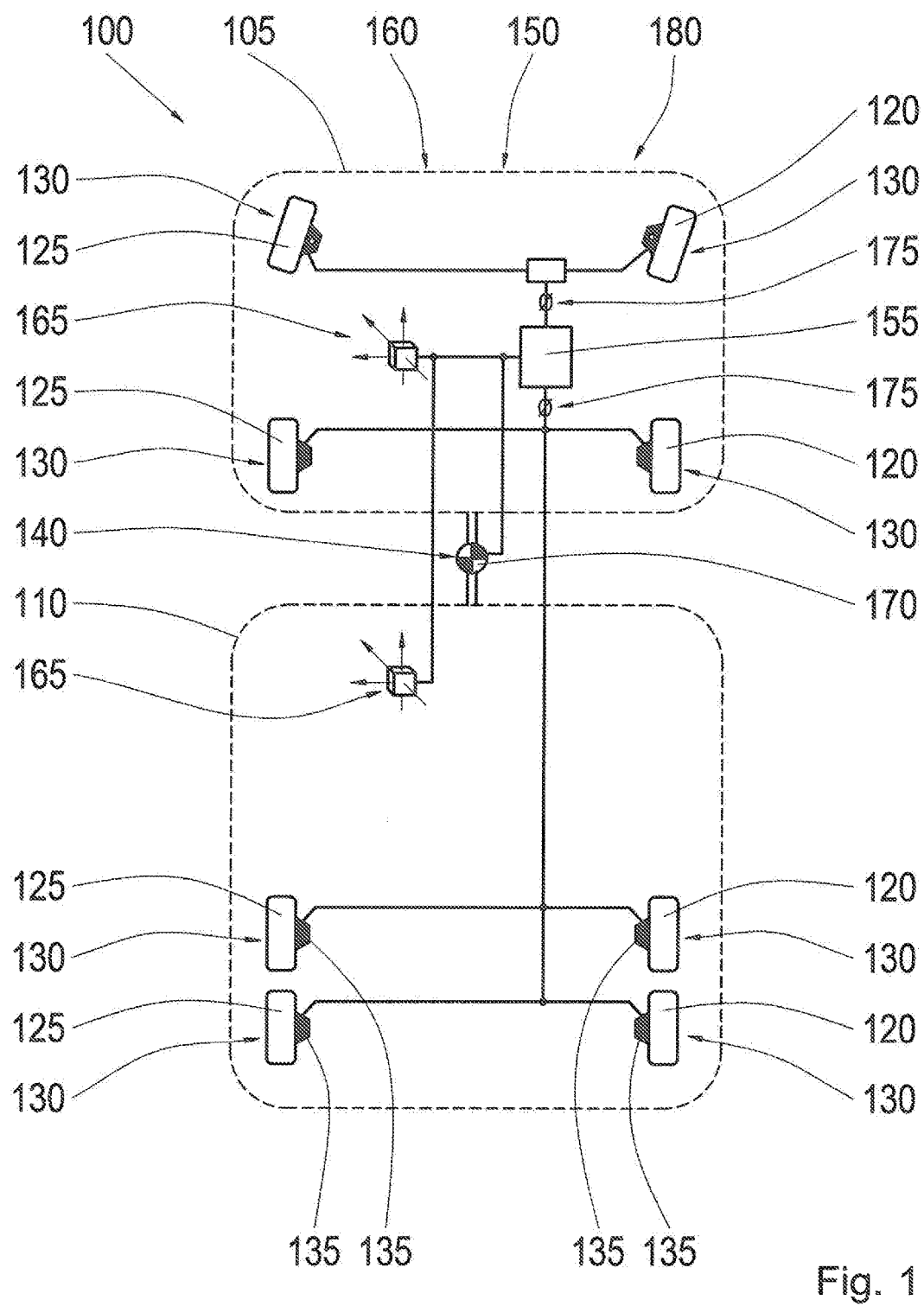
FIG. 1: A schematic representation of a vehicle combination.

FIG. 1 shows a schematic representation of a vehicle combination 100, which in a general way comprises a tractor vehicle 105 and a trailer vehicle 110. In this context various combinations are possible, in particular for example the trailer vehicle 110 can be a rigid-drawbar trailer, an articulated drawbar trailer or semitrailer, also called an articulated trailer. In a further embodiment there can even be a plurality of trailer vehicles 110 attached one behind another to the tractor vehicle 105. The technique described below can also be used in a corresponding manner for combinations with two trailer vehicles 110.

The tractor vehicle 105 usually has a number of wheels 120 on the right side of the vehicle and a number of wheels 125 on the left side of the vehicle. Some of the wheels 120, 125, in particular the foremost wheel 120 on the right and the foremost wheel 125 on the left, can be steered wheels. In a corresponding manner the trailer vehicle 110 has one or more wheels 120 on the right and one or more wheels 125 on the left. Preferably with each wheel 120, 125 there is associated a wheel brake 130 which, in particular, can be activated individually for the wheel concerned. In another embodiment a wheel-specific controllable drive device 135 can be provided on one or more wheels 120, 125, which can in particular be an electric wheel hub motor on the wheels 120, 125 of the trailer vehicle 110.

During the operation of the vehicle combination 100, the tractor vehicle 105 and the trailer vehicle 110 are connected to one another and between them an articulated link 140 can be provided. In what follows it will be assumed as an example that the vehicle combination 100 is an articulated motor vehicle in which the tractor vehicle 105 is a machine for towing a trailer and the trailer vehicle 110 is a semitrailer. In this case the link 140 can comprise in particular a king-pin which can be connected to and rotate in a trailer coupling of the tractor vehicle 105.

A control unit 150 for the vehicle combination 100 comprises a processing device 155 and a sensor system 160 for determining a yaw rate difference between a yaw rate of the tractor vehicle 105 and a yaw rate of the trailer vehicle 110. In particular the sensor system 160 can comprise yaw rate sensors 165, one fitted on the tractor vehicle 105 and the other on the tractor vehicle 110. The rate of rotation of the respective vehicle 105, 110 about a vertical axis can be determined by means of the yaw rate sensor 165. A difference between the two yaw rates can be computed by one of the two yaw rate sensors 165 or by the processing device 155. In another embodiment an angle sensor 170 is provided in order to determine an articulation angle between the tractor vehicle 105 and the trailer vehicle 110. The angle sensor 170 can be fitted in particular in the area of the link 140. If there are several links 140, for example when the trailer vehicle 110 comprises an articulated drawbar trailer, then several angle sensors 170 can be used at the individual links 140 or one angle sensor 170 be designed to determine the total angle between the vehicles 105 and 110 over all the links. In particular the angle sensor 170 can be in the form of a Hall sensor. The articulation angle determined by means of the angle sensor 170 between the tractor vehicle 105 and the trailer vehicle 110 is preferably differentiated with respect to time, to obtain a yaw rate difference of the vehicles 105, 110. Alternatively the differentiation can be carried out within the angle sensor 170 or by the processing device 155.

In addition, the control unit 150 preferably comprises an interface 175 for connection to a brake system of one of the vehicles 105, 110. By means of that or a further interface 175 a drive system can also be connected to the processing device 155, which in particular enables the control of a drive mechanism 135 by the control unit 150

Furthermore, it is preferable for the control unit 150 or the processing device 155 to be connected via another interface 175 to a steering system 180 of one of the vehicles 105, 110, in order to sense a steering angle of the steered wheels 120, 125.

It is proposed that the control unit 150 should be designed, on the basis of a yaw rate difference between a yaw rate of the tractor vehicle 105 and a yaw rate of the trailer vehicle 110, to determine an instability or a threatened or existing deviation of an orientation of one of the vehicles 105, 110 from an intended travel direction and to carry out a stabilizing intervention by braking and/or accelerating wheels 120, 125 on only one side of the vehicle 105, 110 concerned.

FIGS. 2A-2E show the vehicle combination 100 of FIG. 1 in various driving situations. In all the FIGS. 2A to 2E a travel direction 205 of the tractor vehicle 105, a travel direction 210 of the trailer vehicle 110 and an intended travel direction 215 of the vehicle combination 100 are indicated. The travel directions 205, 210 can also be referred to as orientations, especially when the vehicle combination is at rest. For the sake of simplicity the intended travel direction 215 is assumed to be straight although this technique can also be used, for example, for driving round curves.

Figure 2A:
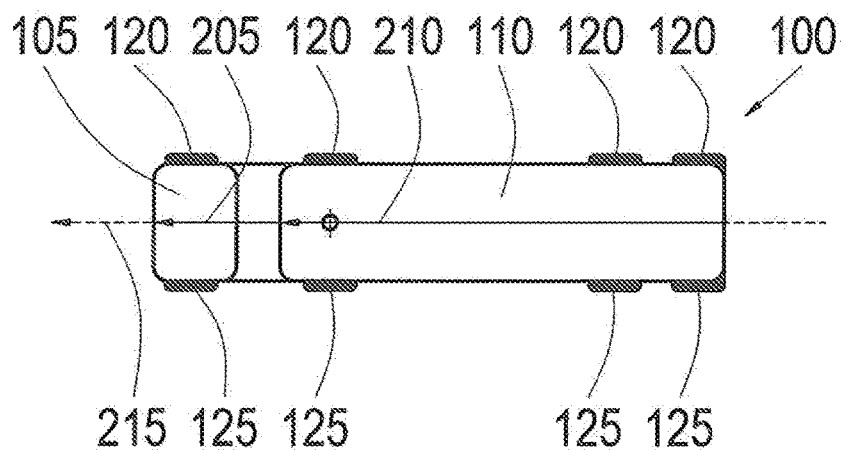
FIGS. 2A-2E: The vehicle combination of FIG. 1 in various driving situations.

In FIG. 2A both the travel direction 205 of the tractor vehicle 105 and the travel direction 210 of the trailer vehicle 110 correspond to the intended travel direction 215. The articulation angle between the tractor vehicle 105 and the trailer vehicle 110 at the link 140 is equal to 0°. Yaw rates of the vehicles 105 and 110 correspond with one another so that the yaw rate difference is zero. The vehicle combination 100 drives in a stable manner and no intervention by the control unit 150 is needed.

Figure 2B:
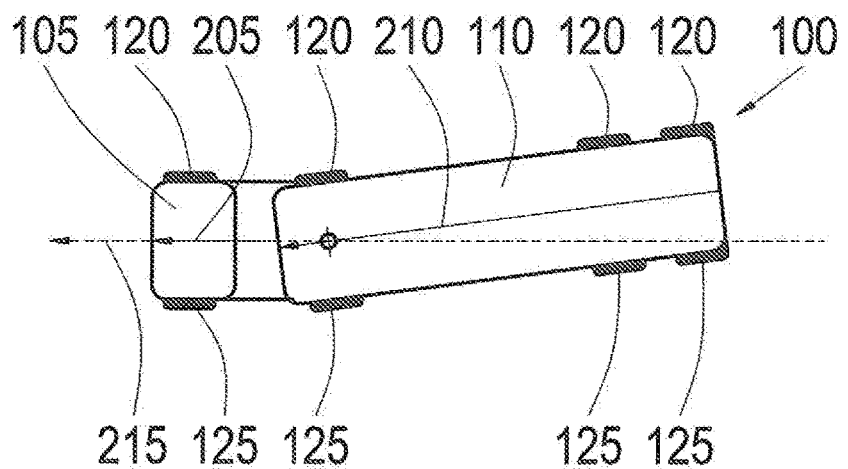

In FIG. 2B the travel direction 205 of the tractor vehicle 105 is the same as the intended travel direction 215 but there is a deviation between the travel direction 210 of the trailer vehicle 110 and the intended travel direction 215. In the example shown, the rear of the trailer vehicle 100 has drifted toward the right. The yaw rate of the trailer vehicle 110 differs from the yaw rate of the tractor vehicle 105, so that the yaw rate difference exceeds a predetermined amount. The articulation angle between the tractor vehicle 105 and the trailer vehicle 110 is becoming larger at a rate that corresponds to the yaw rate difference. To stabilize the trailer vehicle 110 and reduce the deviation of its travel direction 210 from the intended travel direction 215, wheels 120, 125 of the trailer vehicle 110 are influenced in order to produce a torque about a vertical axis of the trailer vehicle 110 that reduces the yaw rate difference and aligns the trailer vehicle 110 correctly again relative to the tractor vehicle 105. In the representation shown in FIG. 2B the trailer vehicle 110 is rotated counter-clockwise out of a desired position so that a clockwise torque should be applied. For this, one or more of the wheels 120 on the right of the trailer vehicle 110 can be braked. The torque can be increased still more if in addition one or more of the wheels 125 on the left are accelerated.

Figure 2C:
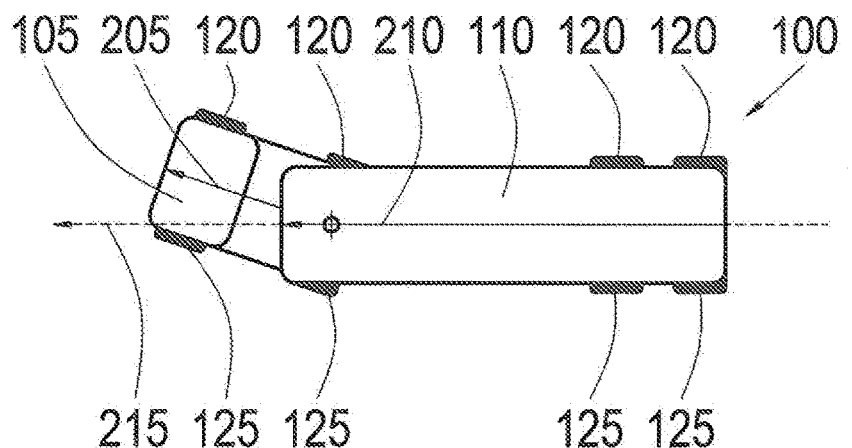

In FIG. 2C the travel direction 210 of the trailer vehicle 110 matches the intended travel direction 215 of the vehicle combination 100 but the travel direction 205 of the tractor vehicle 105 deviates from the intended travel direction 215. As an example a drift of the front of the tractor vehicle 105 to the right is shown. Due to different yaw rates of the tractor vehicle 105 and the trailer vehicle 110, the yaw rate difference is again different and the articulation angle increases as a function of the yaw rate difference. In order to stabilize the tractor vehicle 105, as described with reference to FIG. 2B above a torque is produced about the vertical axis of the tractor vehicle 105. In the present example a counter-clockwise torque is required in order to bring the travel direction 205 of the tractor vehicle 105 into alignment with the intended travel direction 215 of the vehicle combination 100. Accordingly, one or more wheels 125 on the left of the tractor vehicle 105 are braked and optionally, in addition one or more of the wheels 120 on the right are accelerated.

Figure 2D:
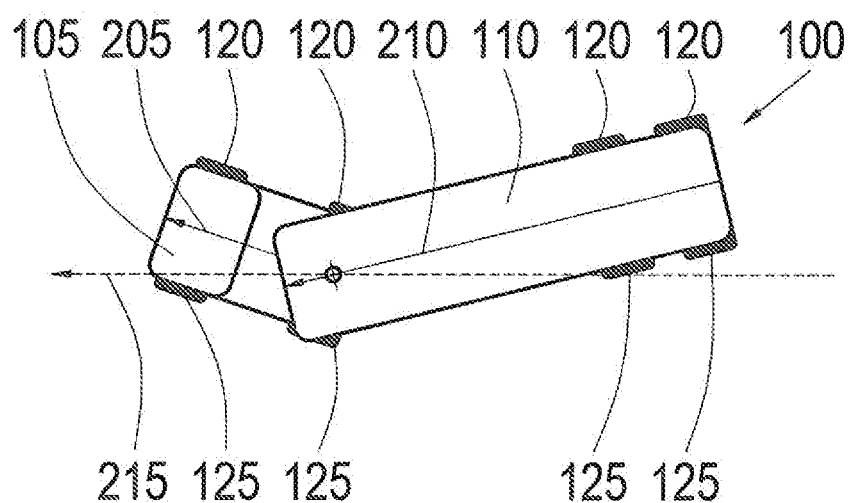

FIG. 2D shows a situation in which the travel direction 205 of the tractor vehicle 105 and the travel direction 210 of the trailer vehicle 110 both deviate from the intended travel direction 215, but in different directions. To correct this, each of the vehicles 105, 110 is stabilized and brought back to the travel direction 215, individually, by braking interventions on one side and if needs be supportive accelerations on one side (see FIGS. 2B and 2C).

Figure 2E:
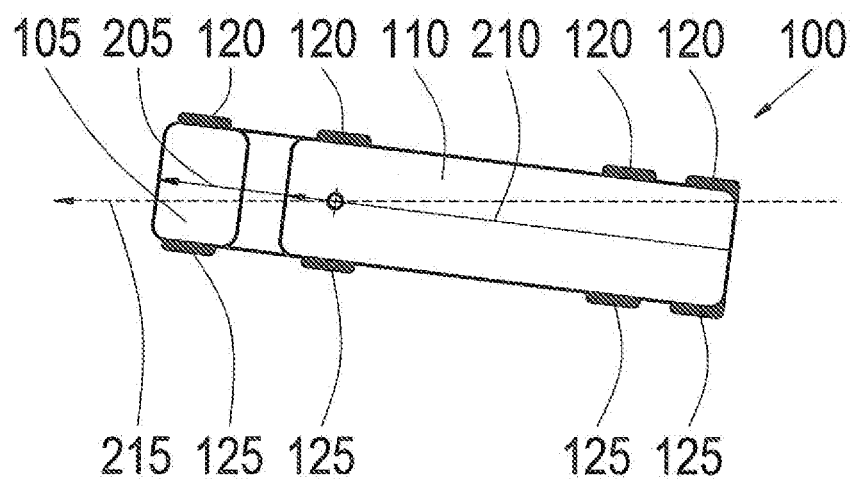

In FIG. 2E both travel directions 205, 210 deviate in the same direction from the travel direction 215. To stabilize and minimize the deviations of the travel directions 205, 210 from the intended travel direction 215, the control unit 150 preferably applies a braking action on wheels 120, 125 on the same vehicle side of both vehicles 105, 110. In addition, on the other side of the vehicles an acceleration can be produced on one or more wheels 120, 125. In the case illustrated, preferably the wheels 125 on the left are braked and if necessary the wheels 120 on the right are also accelerated.

Whereas the yaw rate difference can be determined on the basis of a time derivative of the articulation angle between the tractor vehicle 105 and the trailer vehicle 110, it is preferable to determine a yaw rate or a travel direction 205, 210 of at least one of the vehicles 105, 110 in absolute terms in order to be able to decide which of the vehicles 105, 110 is deviating from the intended travel direction 215.

The interventions at the wheels 120, 125 can be made dependent on various conditions. For example, an intervention might only take place when a speed of the vehicle combination 100 exceeds a predetermined threshold value. In that way, for example, shunting maneuvers or driving around curves in built-up areas can be carried out without giving rise to stabilizing interventions.

A threshold value that must be exceeded by the yaw rate difference before a stabilizing intervention is carried out, can be determined dynamically. The threshold value can in particular be determined on the basis of the speed of the vehicle combination 100 and/or a steering angle or a deflection rate of steered wheels 120, 125 on one of the vehicles 105, 110. In an embodiment this threshold value can be lowered in a manner controlled by events. For example, if an ABS intervention occurs in one of the vehicles 105, 110, the threshold value can be reduced to a very low value or to zero, in order to bring about a stabilizing intervention by the control unit 150.

In a particularly preferred embodiment the vehicle combination 100 is designed to be controlled autonomously. The autonomous control can in particular be carried out by the control unit 150. In contrast to a driver assistance system the autonomous control can control the driving behavior of the vehicle combination 100, in particular its longitudinal and transverse control, completely automatically, without monitoring by a human being and in particular without the need for a driver of the tractor vehicle 105. For this, usually numerous sensor values such as from radar sensors, navigation sensors, camera recordings and other values have to be envisioned in real time. The data can even be compared with map data that describe an environment of the vehicle combination 100.

The autonomous control can in addition be carried out on the basis of the above-described correlation between a steering angle, turning rates or yaw rates of the vehicles 105, 110, a vehicle length or a speed. The above-described technique can be part of the autonomous control system.

INDEXES

100 Vehicle combination
105 Tractor vehicle
110 Trailer vehicle
120 Wheel on the right
125 Wheel on the left
130 Wheel brake
135 Drive mechanism
140 Articulated link
150 Control unit
155 Processing device
160 Sensor system
165 Yaw rate sensor
170 Angle sensor
175 Interface
180 Steering
205 Travel direction of the tractor vehicle
210 Travel direction of the trailer vehicle
215 Intended travel direction

The invention claimed is:

1. A method of controlling a vehicle combination having a tractor vehicle and a trailer vehicle, the method comprising:
   determining a yaw rate difference between a yaw rate of the tractor vehicle and a yaw rate of the trailer vehicle;
   on a basis of the yaw rate difference, determining that an orientation of one of the tractor and the trailer vehicle deviates from an intended travel direction of the vehicle combination;
   providing wheels on different sides of the vehicle and, in each case, and wheel brakes being associated with each of the wheels;
   activating at least one wheel brake of the vehicle concerned on only one side of the vehicle in order to counter the orientation deviation of the vehicle relative to the intended travel direction;
   accelerating a wheel on an unbraked side of the vehicle to counter the orientation deviation of the vehicle; and
   intermittently applying the wheel brake of the wheel on the braked side of the vehicle and increasing the acceleration of the wheel on the unbraked side of the vehicle, during braking pauses, to counter the orientation deviation of the vehicle.

2. The method according to claim 1, further comprising determining the intended travel direction on the basis of a steering angle of a steered wheel of one of the tractor and the trailer vehicle.

3. The method according to claim 2, further comprising determining the intended travel direction on the basis of a speed of one of the tractor and the trailer vehicle.

4. The method according to claim 1, further comprising determining the yaw rate difference on the basis of a time derivative of an articulation angle enclosed by the tractor vehicle relative to the trailer vehicle.

5. The method according to claim 1, further comprising determining a length of the vehicle combination on the basis of a variation of the yaw rate difference while driving around a known curve.

6. A control unit for a vehicle combination comprising a tractor vehicle and a trailer vehicle, the control unit comprises:
   a sensor system for determining a yaw rate difference between a yaw rate of the tractor vehicle and a yaw rate of the trailer vehicle;
   a processing device for determining, on a basis of the yaw rate difference, an orientation deviation of one of the tractor and the trailer vehicle which is deviating from an intended travel direction of the vehicle combination;
   each of the tractor and the trailer vehicle having wheels on different sides of the respective vehicle and respective wheel brakes being associated with each of the respective wheels;
   the processing device being designed to activate a desired wheel brake of the vehicle, on only one side of the vehicle, in order to counter the orientation deviation of the vehicle relative to the intended travel direction of the vehicle;
   the processing device being designed to activate acceleration of a wheel on an unbraked side of the vehicle to counter the orientation deviation of the vehicle; and
   the processing device being designed to activate intermittent application of the wheel brake of the wheel on the braked side of the vehicle, and increasing the acceleration of the wheel on the unbraked side of the vehicle, during braking pauses, to counter the orientation deviation of the vehicle.

7. A device according to claim 6, wherein the processing device is designed to control the vehicle combination autonomously.

8. A method of controlling a vehicle combination having a tractor vehicle and a trailer vehicle, each of the trailer vehicle and the tractor vehicle having wheels located on opposed lateral sides thereof, and each of the wheels have a respective brake, the method comprising the following steps:
   determining a yaw rate of the tractor vehicle via a first yaw rate sensor, and determining a yaw rate of the trailer vehicle via a second yaw rate sensor;
   determining a yaw rate difference, via either a processing device or one of the first and the second yaw rate sensors, between the yaw rate of the tractor vehicle and the yaw rate of the trailer vehicle;
   determining, based on the yaw rate difference, when at least one of the tractor vehicle and the trailer vehicle is deviating from an intended travel direction of the vehicle combination;
   activating, via a control device, at least one wheel brake located on only one lateral side of the at least one of the tractor vehicle and the trailer vehicle that is deviating from the intended travel direction to counter the deviation from the intended travel direction; and
   providing the vehicle concerned with a plurality of wheels, arranged one behind another, on both sides of the vehicle, and activating the wheel brakes of the wheels in accordance with their position in relation to a driving direction of the vehicle, consecutively from a rear toward a front the vehicle.

* * * * *